United States Patent [19]

Lambrecht et al.

[11] B 4,012,049
[45] Mar. 15, 1977

[54] FLOATING RING SEAL MEANS

[75] Inventors: Dietrich Lambrecht; Erich Weghaupt, both of Mulheim (Ruhr); Lothar Grimm; Helmut Munch, both of Frankenthal, all of Germany

[73] Assignee: Kraftwerk Union Aktiengesellschaft, Mulheim (Ruhr), Germany

[22] Filed: Oct. 31, 1974

[21] Appl. No.: 519,623

[44] Published under the second Trial Voluntary Protest Program on April 6, 1976 as document No. B 519,623.

[30] Foreign Application Priority Data

Nov. 2, 1973 Germany ............................ 2354998

[52] U.S. Cl. .................................. 277/27; 277/73; 277/83
[51] Int. Cl.² ....................... F16J 15/34; F16J 15/40
[58] Field of Search ...................... 277/27, 71–76, 277/23

[56] References Cited

UNITED STATES PATENTS

| | | | |
|---|---|---|---|
| 3,580,587 | 5/1971 | Born | 277/73 |
| 3,623,736 | 11/1971 | Petrie | 277/27 |
| 3,851,741 | 12/1974 | Sugahara | 277/73 |

*Primary Examiner*—Robert I. Smith
*Attorney, Agent, or Firm*—Herbert L. Lerner

[57] ABSTRACT

Floating ring seal means for cooling water pumps, especially for cooling water connectors of water-cooled rotors of turbogenerators. A stabilization of the floating ring is achieved through pistons which are pressurized by pump pressure. This results in a ring seal holding force which increases proportionally to an increasing number of revolutions.

8 Claims, 2 Drawing Figures

FLOATING RING SEAL MEANS

The invention relates to a floating ring seal for rotating shafts for sealing off a chamber filled with liquid above atmospheric pressure from a space at atmospheric pressure, and more particularly to such means for use with pumps for liquids with a pressure which is used to stabilize the floating ring in its radial position against radial housing walls.

Conventional ring seals, for instance as shown in German Published Prosecuted application, DT-AS 1,910,805, are, in general, pressed against a radial wall of the seal housing by a spring which acts in an axial direction, in order to avoid vibration of the floating seal with vibration of the rotating shaft and thereby causes damage of rubbing areas between the floating seal and the housing wall. However, this contact pressure must not be so great that the floating ring cannot move in case of displacement of the shaft and therefore become unable to follow the new position of the shaft.

Because the transmission of shaft vibration and the required force to compensate are dependent on the number of revolutions and increase with a higher number of revolutions, a greater holding force must be applied at higher rotating speed. This increase of holding force at higher speeds cannot be accomplished by conventional springs.

The primary object of the invention is therefore to provide a floating ring seal, whereby an increasing holding force acts on the floating ring with an increasing number of shaft revolutions.

Another object of the invention is to provide new and improved floating ring seal means actuated by pistons which are pressurized proportionally to shaft rotation speed.

Another object is to provide new and improved means in a rotating shaft machine having a housing and a pressurized chamber, floating ring seal means for rotating shafts for sealing off the pressurized chamber from a chamber at atmospheric pressure, and having a pump for cooling liquids, comprising a floating ring seal in said housing, a pressure member connected to stabilize said floating ring in its radial position and force it against the housing wall, said pressure member comprising at least one hydraulically activated piston connected to a pressure source whose pressure increases proportionally to an increasing number of rotations of the rotating shaft, said pressure source being connected to operate said piston.

As a solution to this problem, the invention provides a pressure medium for the floating ring comprising at least one or more hydraulic pistons which are connected to a pressure source whose pressure increases with increasing rotational speed. The high pressure chamber of a pump can be used as a pressure source for this purpose. By utilizing the pump's pressure, an axial pressure force at the floating ring is generated, which is proportional to the number of revolutions.

The seal of the present invention is of great importance for pumps for cooling media for liquid-cooled rotors of turbogenerators which are operated at speeds of 3,000 or 3,600 rpm. Because of the high rotational speed of the large cooling liquid volume, which is required for cooling of the generator and because conditions are different than are usually encountered with rotary pumps due to the central rotor bore, cavitation difficulties occur, which have to be counteracted by an increasing of the pressure. By this increased pressure, sealing problems are bound to arise at the shaft which cannot be solved with conventional seals.

Therefore, the invention provides, in the case of cooling pumps for liquid-cooled rotors of turbogenerators, a floating ring seal disposed in the housing wall between the cooling water discharge chamber and the adjacent water chamber. An hydraulic pipeline which pressurizes the piston, is connected to the high pressure side of the cooling pump and also to an auxiliary pump for maintenance of the necessary pressure when the generator operates at low speed.

The construction of the seal is such that the floating ring has a flange which, on one side is connected to an annular machined surface with a removable seal ring and, on the other side, is acted upon by several pistons which are axially movable and whose hydraulic cylinders are connected by a pressure line to the output chamber of the cooling pump.

Referring to the drawings of an embodiment of the invention, illustrated in a turbogenerator, the construction and function will be explained in detail.

Other features which are considered as charactersitic for the invention are set forth in the appended claims.

Although the invention is illustrated and described herein as embodied in a particular embodiment, it is nevertheless not intended to be limited to the details shown, since various modifications may be made therein without departing from the spirit of the invention and the scope and range of equivalents of the claims.

The construction and method of operation of the invention, however, together with additional objects and advantages thereof will be best understood from the following description when read in connection with the accompanying drawings, in which.

Figure 1:
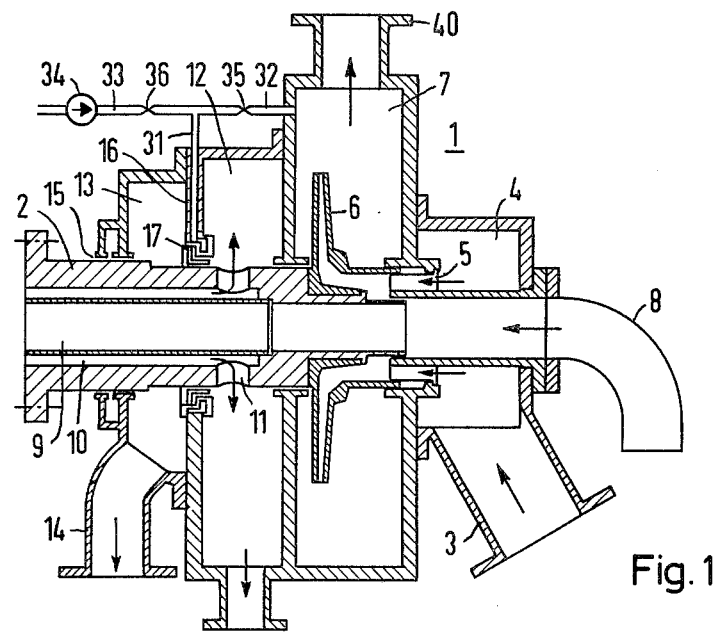
FIG. 1 is a longitudinal sectional view through a cooling water connecting assembly of a turbogenerator.

In FIG. 1, there is shown a longitudinal section through a cooling water connector assembly 1 which surrounds the input side of the shaft end 2 of a water cooled rotor of a turbogenerator, not shown. The cooling water is sucked in from a collection tank not shown, which is mounted at a certain geodetic height above the generator, through the short pipe 3, the suction chamber 4, and the stationary guide baffles 5, and by the rotating pump 6, which is mounted on the end of the shaft and which rotates with it. The cooling water is further directed from the high pressure chamber 7, through pipe 40, and by an exterior circulation system, not shown, to the stationary input pipe 8 and to the axial rotor input passage 9 of a turbogenerator.

From there, the cold cooling liquid flows to the exciter section of the rotor and then through duct 10 which surrounds the rotor entry bore 9 concentrically and through the radial shaft holes 11 into the discharge chamber 12 for the heated cooling medium.

In the case of turbogenerators which are driven at an RPM $n=1500$, there are hardly any cavitations in the cooling water pump 6, so that the pressure generated by the geodetic height of the cooling water reservoir is sufficient for satisfactory operation. However, in the case of generators at an RPM of $n=3000$ to $n=3600$, there are stronger cavitation effects in the pump. To prevent the cavitation, the pressure of the cooling water flowing in from the reservoir must be raised to approximately 3 atmospheres by a cushion of presurrized gas. Because of this increased pressure of the heated cooling water in discharge chamber 12, a sealing gland of discharge chamber 12 to the adjacent water chamber 13 comprising a conventional labyrinth seal, i.e. non touching gap, is not sufficient, because an excessive water volume gets into chamber 13 because of the increased pressure. This has to be ducted from there by means of tube 14 to an oxygen extracting device because of the oxygen from the air which leaks in through the outer shaft seal 15.

Figure 2:
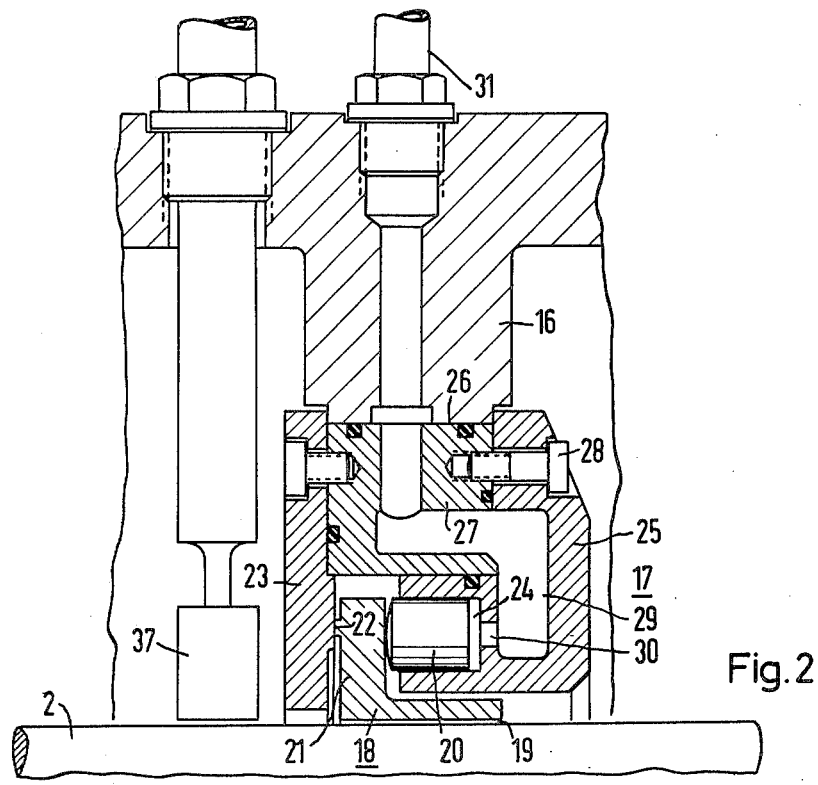
FIG. 2 is a partial enlarged detail view of FIG. 1 showing the area of the floating ring seal.

For this reason, the invention provides in the separation wall 16 between discharge chamber 12 and the water chamber 13 a floating ring seal 17, which is shown in FIG. 2 in enlarged scale.

This type of floating ring seal has a very small gap of approximately 0.2 mm between the floating ring 18 and the shaft 2. The seal is designed so that with shaft vibrations of more than 150 $\mu$m (micrometers), due to the hydraulic forces in the gap which increase with the number of rotations, the floating ring 18 is also caused to vibrate. At low RPM the floating ring 18 could be held by axial tension springs. However, since with increasing number of rotations, vibrations are transferred with more force to the floating ring and the ring has to respond also to displacements of the shaft. A tension arrangement with springs does not allow for response proportional to the existing operating condition. For this reason, the invention provides that the position of the floating ring is stabilized by a pressure force which increase proportionally to the number of revolutions.

The floating ring 18 is stabilized by axial pistons 20, which are directly acted on by pump pressure, namely, by pressure from high pressure chamber 7.

As can best be seen in FIG. 2, the floating ring 18 on the shaft 2, has a radial flange 21, which on its outer side mates with a circular boss 22 of a removable round cover 23, of the seal housing. Against the other side of the floating ring flange press several pistons 20 which are mounted in cylindrical bores 24. These cylindrical bores are recessed in the face of a ring 25, which is secured at the radial outer edge adjacent to wall 16 of the cooling water connector assembly with bolts 28 to the body of the sealing member 27 which seals the axial bore 26.

The sealing member 27, in conjunction with ring 25, forms a concentric hydraulic chamber 29, which communicates by holes 30, with the piston cylinder 24, and also directly with the pressure chamber 7, of pump 6, by means of the hydraulic line 31, through separation wall 16, to the outside and a branch line 32, (FIG. 1).

In this way, the pistons 20, are always under pressure which is proportional to the pump pressure in the pressure chamber 7, i.e. with increasing number of revolutions, the pistons 20 are pressed with increasing force against the floating ring 18 and hold it in a fixed position between piston 20 and housing ring 23, in such a manner that vibration of the shaft of less than 150 $\mu$m do not also induce motion in the floating ring. However, this holding force is not so strong that the floating ring cannot follow eventually occurring larger shaft excursions.

To assure reliable functioning of the seal at very low rotational speed, as for instance, in trial operations, an additional branch line 33 is connected to hydraulic line 31 and leads to an auxiliary pump 34. Both branch lines 32 and 33 may be individually closed by valves 35 and 36. At low power operation, by means of this auxiliary pump 34, after closing valve 35, the required contact pressure for the pistons 20, as well as the stabilization of the floating ring 18 can be provided.

In order to be able to measure the shaft displacements, i.e. vibrations in FIG. 2, there is also shown an induction displacement sensor 37, which can be used in conjunction with suitable measuring and display instruments for control and adjustment of the hydraulic pressure for contact force of the floating ring.

An additional important advantage results from the described floating ring seal and its use in a cooling water connecting assembly of a turbogenerator. By use of such a floating ring seal in the wall adjacent to the cooling water discharge chamber, it is possible to omit a pressure reduction chamber located between the discharge chamber and the water chamber, as was required for gap seals up to now, so that the size of the cooling water connecting assembly and shaft can be reduced.

The floating ring seal according to the invention is shown as applied to the cooling water connecting assembly of a turbogenerator. Construction and application of this type of seal are not limited to the illustrated embodiments, however, but can be used for all other types of pumps and for sealing of rotating shafts where vibrations of the shaft occur and where chambers with liquids with a pressure above the outer atmosphere or at atmospheric pressure have to be sealed off.

It is claimed:

1. In a rotating shaft machine having a housing and a pressurized chamber, floating ring seal means for rotating shafts for sealing off the pressurized chamber from a chamber at atmospheric pressure, and having a pump for cooling liquids; a floating ring seal in said housing, said ring having a radial flange which presses one side against the wall of said housing to provide a seal to prevent flow of liquid between said side of said radial flange and said housing wall, pistons located in the housing acting on the other side of said radial flange to avoid radial vibration of said floating ring with vibration of the rotating shaft and force it against the housing wall, said pistons being connected to and pressurized by a pressure source whose pressure increases proportionally to an increasing number of rotations of the rotating shaft.

2. Floating ring seal according to claim 1, wherein the high pressure output chamber of the pump which moves the liquid serves as the pressure source.

3. Floating ring seal according to claim 2, having an auxiliary pump provided as an additional pressure source, said pump being connected into the system with a cut-off valve.

4. Floating ring seal according to claim 1, wherein in the case of cooling pumps for liquid cooled rotors of turbogenerators, the floating ring seal is disposed in a housing wall between a cooling water discharge chamber and the adjacent water chamber and wherein an hydraulic line which activates the pistons is connected to the high pressure chamber of said cooling pump and also to an auxiliary pump.

5. Floating ring seal according to claim 2, wherein the floating ring has, at one end, a radial flange, one side of said radial flange being positioned to seat on a circular boss of a removable sealing ring, a plurality of axially movable pistons positioned on the other side of said flange, the chambers of said pistons being connected with the high pressure chamber of the pump by means of an hydraulic line.

6. Floating ring seal according to claim 5, wherein the hydraulic line has a branch connected to an auxiliary pump.

7. Floating ring seal according to claim 6, having pressure lines from the pump chamber and from the axuiliary pump, which are controlled by shut-off valves.

8. Floating ring seal according to claim 5, having a shaft displacement measuring device whereby the hydraulic pressure acting on the pistons can be monitored with respect to the displacement level.

* * * * *